US008538384B2

(12) United States Patent
Khanfouci et al.

(10) Patent No.: US 8,538,384 B2
(45) Date of Patent: Sep. 17, 2013

(54) METHOD FOR SETTING OR MAINTAINING A PREFERENTIAL CONDITION FOR A MOBILE TERMINAL

(75) Inventors: Mourad Khanfouci, Rennes (FR); Herve Bonneville, Rennes (FR); Nicolas Gresset, Rennes (FR); Loic Brunel, Rennes (FR); David Mottier, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 384 days.

(21) Appl. No.: 12/636,966

(22) Filed: Dec. 14, 2009

(65) Prior Publication Data

US 2010/0173612 A1 Jul. 8, 2010

(30) Foreign Application Priority Data

Jan. 8, 2009 (EP) .................................. 09150188

(51) Int. Cl.
*H04L 12/58* (2006.01)
*H04M 1/725* (2006.01)

(52) U.S. Cl.
USPC ................ 455/412.1; 455/63.1; 455/67.13; 455/436; 455/444; 455/522; 455/552.1; 455/553.1; 370/310.2; 370/318; 370/328; 370/331; 370/338

(58) Field of Classification Search
USPC .............. 455/412.1, 436–444, 63.1, 67.17, 455/522, 552.1, 553.1; 370/310.2, 318, 328, 370/331–334, 338
See application file for complete search history.

(56) References Cited

U.S. PATENT DOCUMENTS 6,097,937 A * 8/2000 Sawyer .......................... 455/406
2007/0025293 A1 * 2/2007 Choi ............................. 370/331
2008/0049675 A1 * 2/2008 Burgan et al. ................. 370/331
2009/0238114 A1 * 9/2009 Deshpande et al. ........... 370/328
2011/0021240 A1 * 1/2011 Hiltunen et al. ............... 455/522

FOREIGN PATENT DOCUMENTS

| WO | WO 2008/072055 A2 | 6/2008 |
| WO | WO 2008/096240 A1 | 8/2008 |
| WO | WO 2008/135101 A1 | 11/2008 |

OTHER PUBLICATIONS

3rd Generation Partnership Project; Technical Specification Group TSG RAN Evolved Universal Terrestrial Radio Access Network (E-UTRAN); Self-configuring and self-optimizing network use cases and solutions (Release 8), 3GPP TR 36.902 V1.0.0, Feb. 2008, XP-002536693, 15 pages.
Nokia Siemens Networks: "Uplink and Downlink ICIC Indication" 3GPP TSG-RAN, WG3, R3-080398, XP-050163602, Feb. 2008, 5 pages.
3rd Generation Partnership Project; Technical Specification Group Radio Access Network; Evolved UTRA and UTRAN; Radio Access Architecture and Interfaces (Release 7), 3GPP TR R3.018 V0.10.0, Aug. 2007, XP-050143280, 149 pages.

* cited by examiner

*Primary Examiner* — Steve D Agosta
(74) *Attorney, Agent, or Firm* — Oblon, Spivak, McClelland, Maier & Neustadt, L.L.P.

(57) ABSTRACT

A method and device for setting or maintaining a preferential condition for a mobile terminal. The method includes determining if the base station associated with the mobile terminal is involved in an inter cell interference coordination procedure, setting the preferential condition for the mobile terminal when the mobile terminal is in a communication through a base station not associated with the mobile terminal, if the base station associated with the mobile terminal is involved in an ICIC procedure, and not setting the preferential condition for the mobile terminal when the mobile terminal is in a communication with the remote telecommunication device through a base station not associated with the mobile terminal if the base station associated with the mobile terminal is not involved in an ICIC procedure.

9 Claims, 4 Drawing Sheets

METHOD FOR SETTING OR MAINTAINING A PREFERENTIAL CONDITION FOR A MOBILE TERMINAL

BACKGROUND OF THE INVENTION

1. Field of the Invention

The present invention relates generally to a method and a device for setting or maintaining a preferential condition for a mobile terminal when the mobile terminal is involved in a communication with a remote telecommunication device.

2. Discussion of the Background

Wireless cellular telecommunication networks are largely deployed but there are still some areas not covered by the base stations of the wireless cellular telecommunication network.

For example, the access to the wireless cellular telecommunication network might not be possible for a mobile terminal located in a building, if the signals radiated by the base stations are too attenuated.

Solutions are proposed today. Particular base stations, like home base stations or femto base stations provide coverage areas within the buildings.

These home base stations enable a limited number of mobile terminals to access the wireless cellular telecommunication network through their respective resources in order to maintain the quality of service offered by the home base stations to their mobile terminals or to provide the desired service to their mobile terminals or both. The mobile terminals allowed to access the resources of the network through the home base station may be determined by the owner of the home base station, the network or a combination of both.

The owner must be understood here in the general sense: the owner may only be the main user of the home base station, the owner may be the person who rents the home base station from telecommunication operator and uses the operator's network or the owner may be the person who installs the home base station in his house or office.

For example, only mobile terminals of the owner of the home base station and his family can access to the wireless cellular telecommunication network through the home base station. These mobile terminals are associated with the home base station.

When a mobile terminal is associated to a base station, the mobile terminal accesses the wireless cellular telecommunication network in order to establish a communication with a remote communication device under preferential condition. The preferential condition is for example, a preferential charging policy for given service or preferential services or both.

Other mobile terminals cannot access to the wireless cellular telecommunication network through the home base station. The other mobile terminals are not associated with the home base station.

When the mobile terminals which are not associated to the home base station are close to the home base station, the home base station generates interferences either in the downlink and/or uplink channels which exist between these mobile terminals and the base station they are associated with or with a macro base station of the wireless cellular telecommunication network.

One solution for the reduction of the interference over these mobile terminals is to reduce the signal transmission power of the home base station. Such technique is commonly named ICIC (Inter Cell Interference Coordination procedure).

That power reduction reduces the coverage area of home base stations and this coverage reduction may lower the Quality of Service, may generate service interruption, drop calls for active mobile terminals associated to the home base station and service unavailability for idle mobile terminals associated to the home base station.

SUMMARY

The present invention aims at keeping service continuity at preferential condition for a mobile terminal associated to a base station without generating interference for mobile terminals not associated to the base station.

To that end, the present invention concerns a method for setting or maintaining a preferential condition for a mobile terminal when the mobile terminal is involved in a communication with a remote telecommunication device, the preferential condition being set for the mobile terminal when the mobile terminal is in a communication with the remote telecommunication device through a base station associated to the mobile terminal, characterised in that the method comprises the steps of:

determining if the base station associated to the mobile terminal is involved in an inter cell interference coordination procedure, setting the preferential condition for the mobile terminal when the mobile terminal is in a communication with the remote telecommunication device through a base station not associated to the mobile terminal if the base station associated to the mobile terminal is involved in the inter cell interference coordination procedure, not setting the preferential condition for the mobile terminal when the mobile terminal is in a communication with the remote telecommunication device through a base station not associated to the mobile terminal if the base station associated to the mobile terminal is not involved in the inter cell interference coordination procedure.

The present invention concerns also a device for setting or maintaining a preferential condition for a mobile terminal when the mobile terminal is involved in a communication with a remote telecommunication device, the preferential condition being set for the mobile terminal when the mobile terminal is in a communication with the remote telecommunication device through a base station associated to the mobile terminal, characterised in that the device for setting the preferential condition comprises:

means for determining if the base station associated to the mobile terminal is involved in an inter cell interference coordination procedure, means for setting the preferential condition for the mobile terminal when the mobile terminal is in a communication with the remote telecommunication device through a base station not associated to the mobile terminal if the base station associated to the mobile terminal is involved in the inter cell interference coordination procedure, the means for setting the preferential condition not setting the preferential condition for the mobile terminal when the mobile terminal is in a communication with the remote telecommunication device through a base station not associated to the mobile terminal if the base station associated to the mobile terminal is not involved in the inter cell interference coordination procedure.

Thus, a service continuity at preferential condition defined when the mobile terminal is served by the base station the mobile terminal is associated to is kept for a mobile terminal associated to the base station without generating interference for mobile terminals not associated to the base station.

As the preferential condition is set for the mobile terminal when the mobile terminal is in a communication with the remote telecommunication device through a base station not associated to the mobile terminal if the base station associated to the mobile terminal is involved in the Inter Cell Interference Coordination procedure the mobile terminal still keeps the preferential condition even if the coverage area of the base station the mobile is associated to is reduced.

According to a particular feature, the preferential condition is set for the mobile terminal when the mobile terminal is in or close to the coverage area of the base station associated to the mobile terminal when the base station associated to the mobile terminal is involved in the inter cell interference coordination procedure.

Thus, a mobile terminal under the coverage area of the base station it is associated with may keep preferential conditions even if the mobile terminal has access to the communication services through the resources of another base station it is not associated with.

According to a particular feature, the preferential condition is not set for the mobile terminal when the mobile terminal is not in or close to the coverage area of the base station associated to the mobile terminal when the base station associated to the mobile terminal is involved in the inter cell interference coordination procedure.

Thus, by not giving preferential condition to a mobile terminal not under the coverage of the base station it is associated with when the base station associated to the mobile terminal is involved in the inter cell interference coordination procedure, it is possible to limit the access to preferential condition to only a given area.

According to a particular feature, the determination if the base station associated to the mobile terminal is involved in the inter cell interference coordination procedure is made by detecting the reception of a message transferred by the mobile terminal.

Thus, this message will inform the mobile terminals that the coverage of their base station will be reduced, due to inter cell interference coordination procedure and may be used by the idle mobile terminals under the coverage of their base station to connect to other base stations.

According to a particular feature, the method is executed by a core network device of a wireless cellular telecommunication network comprising the base stations.

Thus, the core network device can inform the mobile terminal under the coverage of the base station involved in inter cell interference coordination procedure that the coverage of their base station will be reduced and may indicate the target base station they are allowed to connect to. This target base station may be defined through information in or obtained by the core network device.

According to a particular feature, the preferential condition for the mobile terminal when the mobile terminal is in a communication with the remote telecommunication device through the base station not associated to the mobile terminal is set for a time duration and/or as far as the mobile terminal is located in or close to the coverage area of the base station associated to the mobile terminal when the base station associated to the mobile terminal is not involved in the inter cell interference coordination procedure.

Thus, the preferential condition setting is limited in time and to the mobile terminals located in or close to the coverage area of the base station associated with them.

According to a particular feature, the preferential condition is a preferential charging policy for a given service or group of services.

Thus, by giving a preferential charging policy, the deployment of home base station is encouraged.

The present invention concerns also a method for notifying that a base station associated to a mobile terminal is involved in an inter cell interference coordination procedure, characterised in that the method comprises the steps executed by the base station associated to the mobile terminal of:
   receiving a message from a device notifying that the base station is involved in an inter cell interference coordination procedure,
   transferring a message to the mobile terminal notifying that the base station is involved in an inter cell interference coordination procedure.

The present invention concerns also a device for notifying that a base station associated to a mobile terminal is involved in an inter cell interference coordination procedure, characterised in that the device for notifying is included in the base station associated to the mobile terminal and comprises:
   means for receiving a message from a device notifying that the base station is involved in an inter cell interference coordination procedure,
   means for transferring a message to the mobile terminal notifying that the base station is involved in an inter cell interference coordination procedure.

Thus, base station will inform all the mobile terminals the base station is associated with, so active terminals will handover to other base stations and will have information showing that the base station they are associated with is involved into an inter cell interference coordination procedure. The preferential conditions may then be maintained for mobile terminals. Idle mobile terminals will store the message and use it when they need to start a communication with a remote communication device.

The present invention concerns also a method for notifying that a base station associated to a mobile terminal is involved in an inter cell interference coordination procedure, characterised in that the method comprises the steps executed by the mobile terminal of:
   receiving a message from the base station associated to the mobile terminal notifying that the base station associated to the mobile terminal is involved in the inter cell interference coordination procedure,
   memorising the received message,
   selecting a base station which is not associated to the mobile terminal,
   transferring a message to the selected base station notifying that the base station associated to the mobile terminal is involved in an inter cell interference coordination procedure.

The present invention concerns also a device for notifying that a base station associated to a mobile terminal is involved in an inter cell interference coordination procedure, characterised in that the device for notifying is included in the mobile terminal and comprises:
   means for receiving a message from the base station associated to the mobile terminal notifying that the base station associated to the mobile terminal is involved in an inter cell interference coordination procedure,
   means for memorising the received message,
   means for selecting a base station which is not associated to the mobile terminal,
   means for transferring a message to the selected base station notifying that the base station associated to the mobile terminal is involved in the inter cell interference coordination procedure.

Thus, idle mobile terminals in or close to the coverage of their base station, involved in inter cell interference coordination procedure will use this notification message to inform another base station they will attempt to connect to, the connection cause is inter cell interference coordination of the base station they are associated to. It is then easy for the other base station to be aware if a base station associated to a mobile terminal is involved into an inter cell interference coordination procedure.

According to still another aspect, the present invention concerns computer programs which can be directly loadable into a programmable device, comprising instructions or portions of code for implementing the steps of the methods according to the invention, when said computer programs are executed on programmable devices.

Since the features and advantages relating to the computer programs are the same as those set out above related to the methods and apparatus according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1:
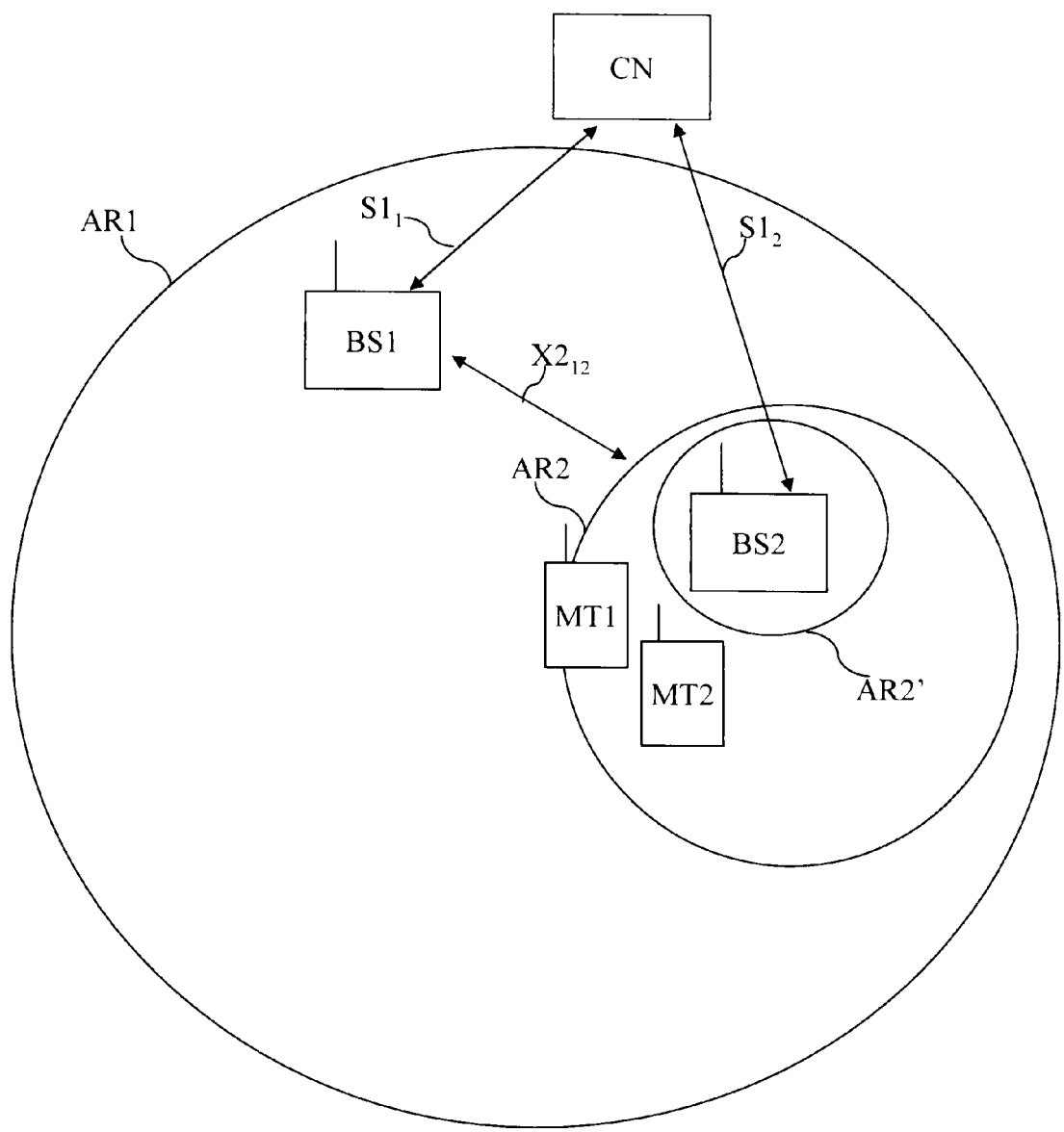
FIG. 1 represents a wireless cellular telecommunication network in which the present invention is implemented.

FIG. 1 represents a wireless cellular telecommunication network in which the present invention is implemented.

In FIG. 1, two base stations BS1 and BS2, of a wireless cellular telecommunication network and two mobile terminals MT1 and MT2 are shown.

The base station BS1 is for example a macro base station of a wireless cellular telecommunication network and the base station BS2 is for example a home base station like femto base station or pico base station. The base station BS2 is for example located into home and may enable mobile terminals MT associated to the base station BS2 to access the wireless cellular telecommunication network at preferential conditions.

The area covered by a base station BS is an area wherein the mobile terminals located in that area can receive signals transferred by the base station BS at a level higher than a first predetermined value. The area covered by a base station BS is an area wherein the base station BS receives, at a level higher than a second predetermined value, the signals transferred by the mobile terminals located in that area or the mobile terminal MT measures signal to interference ratio above a certain threshold or both.

In a variant, the base station BS1 is a home base station like femto base station or pico base station.

For example, the mobile terminal MT2 is associated to the base station BS2, but is not associated to the base station BS1. The mobile terminal MT1 is not associated to the base stations BS1 and BS2.

For example, a base station BS and a mobile terminal MT are associated when the base station BS belongs to the owner of the mobile terminal MT or when the base station BS belongs to the family or friends of the owner of the mobile terminal MT or when mobile telecommunication service provider rents BS to the owner of the mobile terminal MT owner or both.

When the mobile terminal MT2 is associated to the base station BS2, the mobile terminal MT2 may access the wireless cellular telecommunication network in order to establish a communication with a remote communication device under preferential condition. The preferential condition is for example, a preferential charging policy for a given service or a group of services in comparison with the charging policy for a given service or a group of services normally used for charging the mobile terminal MT2 when it accesses the wireless cellular telecommunication network through a macro base station like the base station BS1.

The remote telecommunication device may be for example a mobile phone or a phone linked to a public switched telecommunication network or a server like the server of at least one service provider.

In a variant, the preferential condition may be for example, an access to a preferential service that the mobile terminal MT can not access when it accesses the wireless cellular telecommunication network through the base station BS1.

The base station BS1 is able to receive signals transferred by mobile terminals MT which are located in the coverage area AR1 of the base station BS1. The base station BS1 transfers signals which can be received and processed by mobile terminals MT located in the coverage area AR1 of the base station BS1.

When the base station BS2 is not involved in an ICIC procedure, the base station BS2 is able to receive signals transferred by mobile terminals MT which are located in the coverage area AR2 of the base station BS2. The base station BS2 transfers signals which can be received and processed by mobile terminals MT located in the coverage area AR2 of the base station BS2.

The coverage area AR2 is at least partially comprised in the coverage AR1.

When the base station BS2 is not involved in an ICIC procedure, the base station BS2 is able to receive signals transferred by mobile terminals MT which are located in the coverage area AR2' of the base station BS2. The base station BS2 transfers signals which can be received and processed by mobile terminals MT located in the coverage area AR2' of the base station BS2.

When the base station BS2 is involved in an ICIC procedure, the coverage area AR2' of the base station BS2 is decreased in comparison with the coverage area AR2 of the base station BS2 when the base station BS2 is not involved in an ICIC procedure. It has to be noted here that the coverage area AR2' may be reduced to null.

The mobile terminal MT may continuously monitor the signals transmitted by the base station BS2 and estimates the difference between the coverage areas AR2 and AR2'. Information related to that measurement may be transmitted to the core network device CN that will use it to evaluate if the mobile terminal MT is located or not in the coverage area AR2 of the base station BS2. Core network device CN may assign the value of the coverage area AR2' based on the statistics of the measurements of various mobile terminals MT associated with the base station BS2 and assign thresholds that may help the network evaluating if a mobile terminal MT is in the neighbourhood of the base station BS2 it is associated with.

The mobile terminals MT1 and MT2 are located in the coverage areas AR1 and AR2.

According to a particular feature, when a mobile terminal MT is not associated to a home base station BS, that mobile terminal MT can not establish or receive a communication with a remote telecommunication device through the home base station BS with preferential conditions or not.

When the base station BS2 is operational, the base station BS2 radiates signals which may interfere with the signals received or radiated by the base station BS1.

According to the invention, when the base station BS2 radiates signals which may interfere with the signals received or radiated by the base station BS1, the radiated signal transmit power of the base station BS2 is reduced or the base station BS2 is shut down.

In such case, the coverage area AR2 of the base station BS2 is reduced to the coverage area AR2'. The mobile terminal MT2 is no more located in the coverage area AR2' of the base station BS2. In such case, the mobile terminal MT2 is allowed to access the wireless cellular telecommunication network through the base station BS1 in order to establish a communication with a remote communication device under the same preferential condition as if the mobile terminal MT2 accesses the wireless cellular telecommunication network through the base station BS2.

It has to be noted here that in a variant, the signal transmit power of the base station BS1 is increased and the signal transmit power of the base station BS2 is decreased or maintained at same level as the one when the base station BS2 is not involved into an ICIC procedure.

Each base station BS1 and BS2 is connected to a core network device CN of the wireless cellular telecommunication network through a telecommunication network not shown in FIG. 1.

The base station BS1 is linked to the core network device CN through the link $S1_1$ established on the telecommunication network.

The base station BS2 is linked to the core network device CN through the link $S1_2$ established on the telecommunication network.

The base station BS1 may be linked to the base station BS2 through the link $X2_{12}$ established on the telecommunication network.

According to the invention, the preferential condition is set for the mobile terminal when the mobile terminal is in or close to the coverage area of the base station associated to the mobile terminal when the base station associated to the mobile terminal is involved in the inter cell interference coordination procedure.

According to the invention, the preferential condition is not set for the mobile terminal when the mobile terminal MT is in a communication with a remote telecommunication device through a base station, like the macro base station BS1, not associated to the mobile terminal if the base station BS2 associated to the mobile terminal is not involved in an inter cell interference coordination procedure or if the mobile terminal MT is not located in or not close to the coverage area of the base station BS2 associated to the mobile terminal MT when the base station BS2 is involved in an inter cell interference coordination procedure.

According to the invention, when a base station BS2 associated to a mobile terminal MT is involved in an inter cell interference coordination procedure, the base station BS2 associated to the mobile terminal MT receives a message from a device notifying that the base station BS2 is involved in an inter cell interference coordination procedure, transfers a message to the mobile terminal MT notifying that the base station BS2 is involved in an inter cell interference coordination procedure.

According to the invention, when a base station BS2 associated to a mobile terminal MT is involved in an inter cell interference coordination procedure, the mobile terminal MT:
  receives a message from the base station BS2 associated to the mobile terminal MT notifying that the base station BS2 associated to the mobile terminal MT is involved in the inter cell interference coordination procedure,
  memorises the received message,
  selects a base station BS1 which is not associated to the mobile terminal MT,
  transfers a message to the selected base station BS1 notifying that the base station BS2 associated to the mobile terminal MT is involved in an inter cell interference coordination procedure.

Figure 2:
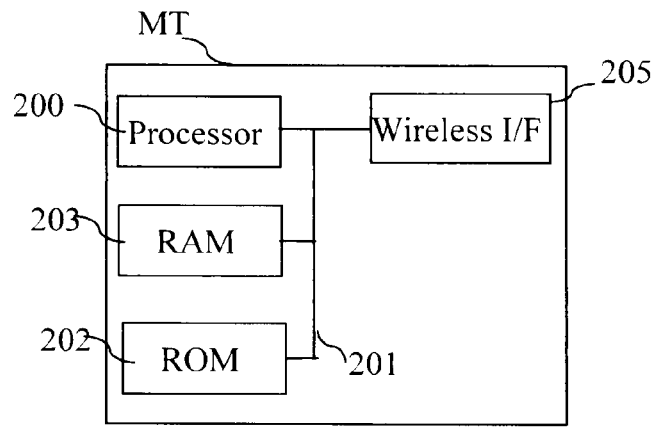
FIG. 2 is a diagram representing the architecture of a mobile terminal in which the present invention is implemented.

FIG. 2 is a diagram representing the architecture of a mobile terminal in which the present invention is implemented.

The mobile terminal MT has, for example, an architecture based on components connected together by a bus 201 and a processor 200 controlled by the program as disclosed in FIG. 5.

The bus 201 links the processor 200 to a read only memory ROM 202, a random access memory RAM 203 and a wireless interface 205.

Figure 5A:
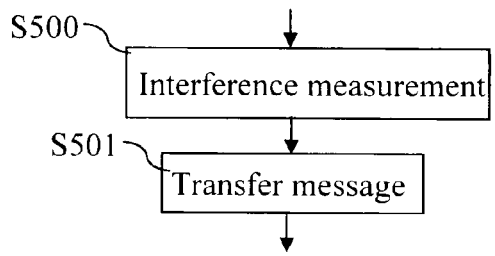
FIG. 5a discloses an example of a first algorithm executed by a mobile terminal according to the present invention.
Figure 5B:
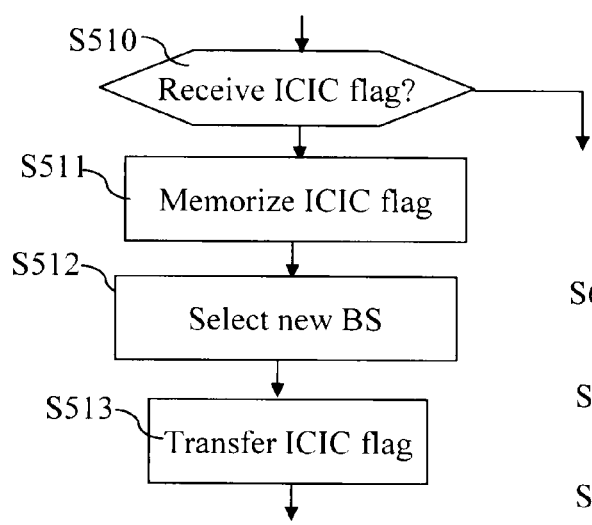
FIG. 5b discloses an example of a second algorithm executed by a mobile terminal according to the present invention.

The memory 203 contains registers intended to receive variables and the instructions of the programs as disclosed in FIGS. 5a and 5b.

The memory 203 may memorise an ICIC flag according to the present invention.

The processor 200 controls the operation of the wireless interface 205.

The read only memory 202 contains instructions of the programs as disclosed in FIG. 5 which are transferred, when the mobile terminal MT is powered on, to the random access memory 203.

The wireless interface 205 enables the mobile terminal MT to transfer and/or receive signals or messages to/from the base stations BS.

The wireless interface 205 comprises means for measuring or detecting the signals transferred by the base stations BS. The signals may be signals interfering with the signals radiated and/or transferred by the base station BS1.

The mobile terminal MT may comprise a Global Navigation Satellite System module like a Global Positioning System module not shown in FIG. 2.

Figure 3:
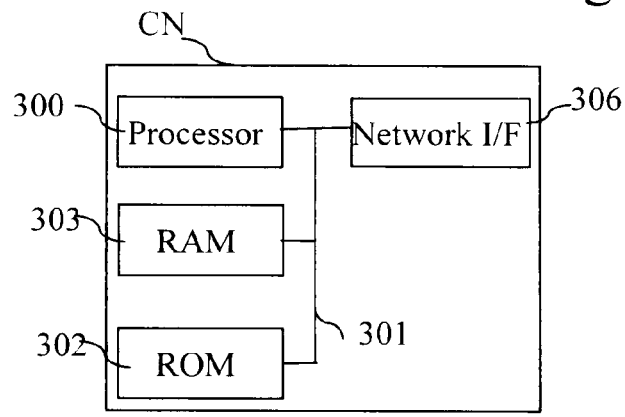
FIG. 3 is a diagram representing the architecture of a core network device in which the present invention is implemented.

FIG. 3 is a diagram representing the architecture of a core network device in which the present invention is implemented.

The core network device CN has, for example, an architecture based on components connected together by a bus 301 and a processor 300 controlled by the programs as disclosed in FIG. 5.

The bus 301 links the processor 300 to a read only memory ROM 302, a random access memory RAM 303 and a network interface 306.

Figure 7A:
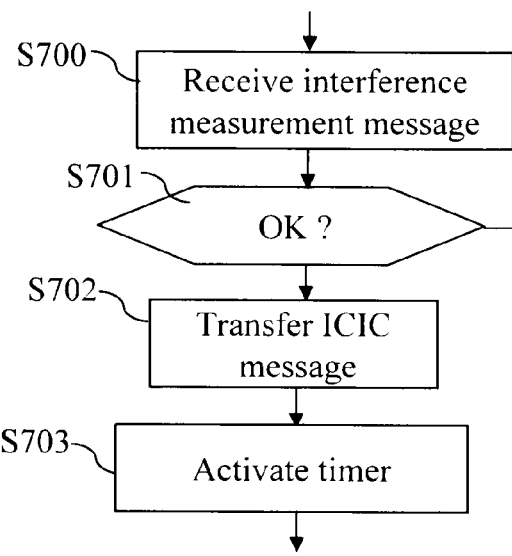
FIG. 7a discloses an example of a first algorithm executed by a core network device according to the present invention.
Figure 7B:
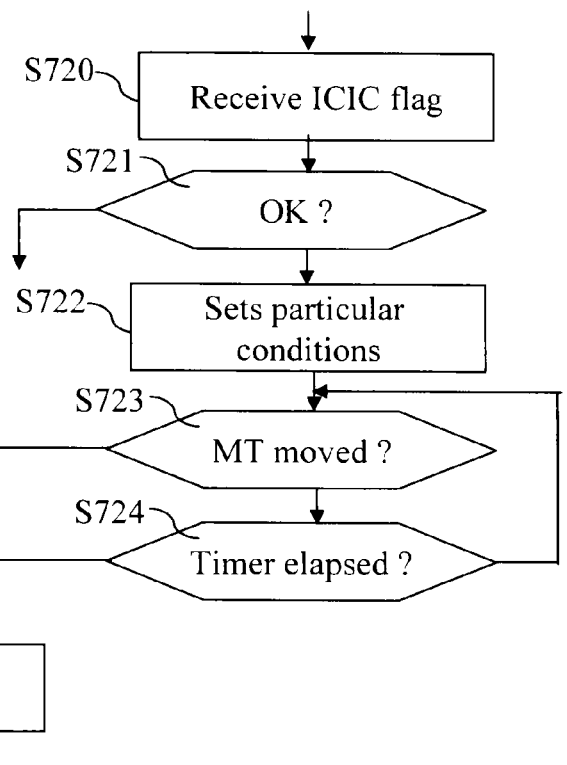
FIG. 7b discloses an example of a second algorithm executed by a core network device according to the present invention.

The memory 303 contains registers intended to receive variables and the instructions of the programs related to the algorithms as disclosed in FIGS. 7a and 7b.

The memory 303 may comprise information identifying each couple of associated mobile terminal MT and base station BS.

The memory 303 may comprise representative of the neighbouring conditions of the base stations BS.

The processor 300 controls the operation of the network interface 306.

The read only memory 302 contains instructions of the programs related to the algorithms as disclosed in FIG. 7, which are transferred, when the core network device CN is powered on, to the random access memory 303.

The core network device CN may be connected to a telecommunication network not shown in FIG. 1 through the network interface 306. For example, the network interface 306 is a DSL (Digital Subscriber Line) modem, or an ISDN (Integrated Services Digital Network) interface, etc. Through the network interface 306, the core network device CN may transfer or receive messages to/from at least one base station BS.

Messages are transferred or received through links S1 established on the telecommunication network between the core network device CN and the base stations BS.

Figure 4:
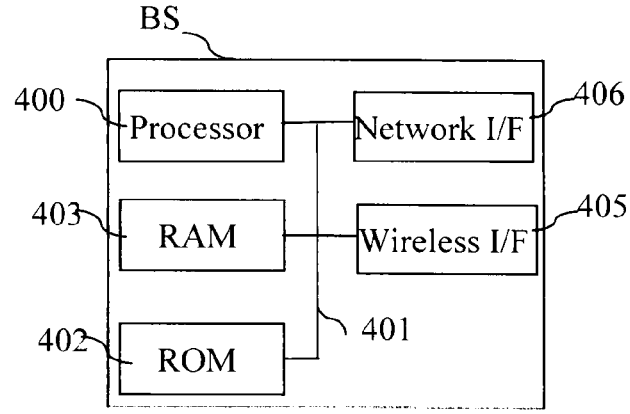
FIG. 4 is a diagram representing the architecture of a base station in which the present invention is implemented.

FIG. 4 is a diagram representing the architecture of a base station in which the present invention is implemented.

Figure 6A:
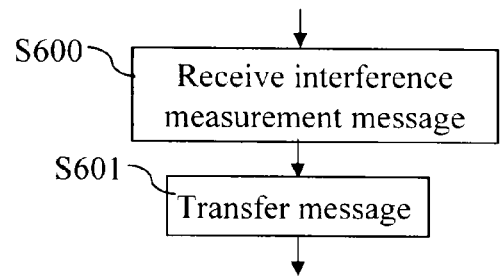
FIG. 6a discloses an example of a first algorithm executed by a base station according to the present invention.
Figure 6B:
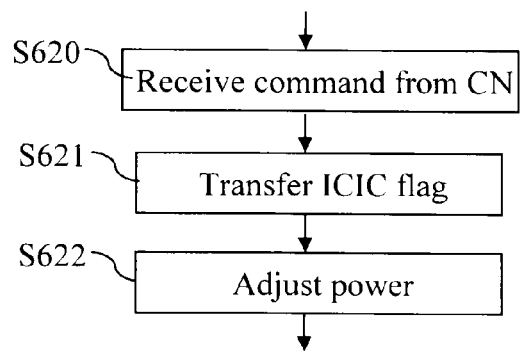
FIG. 6b discloses an example of a second algorithm executed by a base station according to the present invention.

The base station BS has, for example, an architecture based on components connected together by a bus 401 and a processor 400 controlled by the programs as disclosed in FIGS. 6a and 6b.

The bus 401 links the processor 400 to a read only memory ROM 402, a random access memory RAM 403, a wireless interface 405 and a network interface 406.

The memory 403 contains registers intended to receive variables and the instructions of the program related to the algorithm as disclosed in FIG. 6.

The memory 403 may comprise representative of the neighbouring conditions of the base stations BS.

The processor 400 controls the operation of the network interface 406 and of the wireless interface 405.

The read only memory 402 contains instructions of the program related to the algorithms as disclosed in FIG. 6, which are transferred, when the base station BS is powered on, to the random access memory 403.

The base station BS may be connected to a telecommunication network through the network interface 406. For example, the network interface 406 is a DSL (Digital Subscriber Line) modem, or an ISDN (Integrated Services Digital Network) interface, etc. Through the network interface 406, the base station BS may transfer messages to the core network device CN or to other base stations BS or may receive messages from other base stations BS or from the core network device CN.

The messages are transferred through links S1 or X2 established on the telecommunication network between the base station BS and the core network device CN or between the base station BS and other base stations BS.

The wireless interface 405 and the network interface 406 are the resources of the base station BS used by a mobile terminal MT in order to access to the wireless cellular telecommunication network when the mobile terminal MT establishes or receives a communication with a remote telecommunication device.

The wireless interface 405 comprises means for transferring an ICIC flag according to the present invention.

More particularly the ICIC flag may be transferred by the base station BS through a broadcast channel or is transferred by the base station BS to each mobile terminal MT associated to the base station BS and located in the coverage area of the base station BS.

A broadcast channel is a channel which is common to all mobile terminals MT or to at least two mobile terminals MT for receiving signals from a base station BS associated to the mobile terminals.

FIG. 5a discloses an example of a first algorithm executed by a mobile terminal according to the present invention.

More precisely, the present algorithm may be executed by the processor 200 of each mobile terminal MT.

For example, the present algorithm is executed by the processor 200 of the mobile terminal MT1 periodically or when it is requested to proceed to measurement.

At step S500, the processor 200 commands the wireless interface 205 to execute some measurements on signals transferred by the base stations BS surrounding the mobile terminal MT1.

As the mobile terminal MT1 is either located in the coverage areas AR1 and AR2, the signals transferred by the base stations BS1 and BS2 are received by the mobile terminal MT1.

Furthermore, if the mobile terminal MT2 is under communication with a remote telecommunication device through the base station BS2, the signals transferred by the mobile terminal MT2 are also received by the mobile terminal MT1 and the base station BS1.

These received signals are interference signals which may disturb the communication between the base station BS1 and the mobile terminal MT1.

At next step S501, the processor 200 commands the transfer of a message to the base station BS1. The message comprises measurements executed at step S500 and indicators of the strength of the interfering signals that may serve as basis for the ICIC procedure between the base stations BS1 and BS2.

In a variant, the step S501 is not executed.

After that the processor 200 interrupts the present algorithm.

FIG. 5b discloses an example of a second algorithm executed by a mobile terminal according to the present invention.

More precisely, the present algorithm may be executed by the processor 200 of each mobile terminal MT associated to a base station BS.

For example, the present algorithm is executed by the processor 200 of the mobile terminal MT2 when the mobile terminal MT2 is under communication with a remote telecommunication device or when the mobile terminal MT2 is in idle mode.

At step S510, the processor 200 checks if a message comprising an ICIC flag is received from the base station BS2 the mobile terminal MT2 is associated to.

If a message comprising an ICIC flag is received from the base station BS2 the mobile terminal MT2 is associated to, the processor 200 moves to step S511. Otherwise, the processor 200 interrupts the present algorithm.

The ICIC flag may be received by the base station BS2 from the core network device CN and forwarded by the base station BS2.

In a variant, the ICIC flag is deciphered with an encryption key shared by the mobile terminals MT associated to the base station BS2 and the base station BS2.

At step S511, the processor 200 memorises in the RAM memory 203 the ICIC flag.

At next step S512, the processor 200 selects a new base station BS based on measurements performed by the wireless interface 205.

As the mobile terminal MT2 is also located in the coverage area AR1 of the base station BS1, the signals transferred by the base station BS1 are received by the mobile terminal MT2 at a high power, the processor 200 selects the base station BS1.

At next step S513, the mobile terminal MT2 commands the transfer to the selected base station BS1 of a message comprising the ICIC flag.

After that, the mobile terminal MT2 may access the wireless cellular telecommunication network through the base station BS1 under the same preferential condition as if the mobile terminal MT2 accesses the wireless cellular telecommunication network through the base station BS2.

If the mobile terminal MT2 is under communication with a remote telecommunication device, a hard or soft handover is performed with the base station BS1.

FIG. 6a discloses an example of a first algorithm executed by a base station according to the present invention.

More precisely, the present algorithm is executed by the processor 400 of each base station BS.

At step S600, the processor 400 detects the reception of a message comprising measurements on interfering signals. The message is received through the wireless interface 405 and is as the one disclosed at step S501 of the FIG. 5a.

At next step S601, the processor 400 commands the transfer of the message received at step S600 to the core network device CN. The message may further comprise measurements of interfering signals measured by the wireless interface 405 of the base station BS.

After that, the processor 400 interrupts the present algorithm.

FIG. 6b discloses an example of a second algorithm executed by a base station according to the present invention.

More precisely, the present algorithm is executed by the processor 400 of each home base station BS. According to the example of FIG. 1, the present algorithm is executed by the base station BS2.

At step S620, the processor 400 detects the reception of a message transferred by the core network device CN. The message is received through the network interface 406 and is representative of the initiation of an ICIC procedure.

At next step S621, the processor 400 commands the transfer of an ICIC flag through the wireless interface 405.

More particularly the ICIC flag may be transferred through a broadcasted channel or is transferred by the base station BS2 to each mobile terminal MT associated to the base station BS2 and located in the coverage area AR2 of the base station BS2.

In a variant, the ICIC flag is deciphered with an encryption key shared by the mobile terminals MT associated to the base station BS2 and the base station BS2.

At step S622, the processor 400 commands the wireless interface 405 in order to adjust the transmission power of the signals radiated by the wireless interface 405 according to the ICIC procedure.

The transmission power of the signals radiated by the wireless interface 405 may be reduced to a value indicated in the message received at step S620 or may be reduced to null value.

It has to be noted here that in a variant, the transmission power of the signals radiated by the base station BS2 may not be reduced and the transmission power of the macro base station BS which radiates signals in the coverage area AR2 of the base station BS2 is increased.

After that, the processor 400 interrupts the present algorithm.

FIG. 7a discloses an example of a first algorithm executed by a core network device according to the present invention.

More precisely, the present algorithm is executed by the processor 300 of the core network device CN.

At S700, the processor 300 detects the reception of a message through the network interface 306. The message comprises measurements on interfering signals and is as the one transferred by the base station BS1 at step S601 of the algorithm of the FIG. 6a.

At next step S701, the processor 300, using the received message, checks if the signals transferred by base stations BS interfere each other and that the interference level is high (above certain threshold).

In a variant, instead of receiving the message comprising measurements on interfering signals, the processor 300 checks, using geo-location information of the base stations BS if the signals transferred by base stations BS may interfere each other.

In another variant, the step S701 is executed by a base station BS. In such case, instead of receiving the message comprising measurements on interfering signals, the processor 300 receives a message indicating that signals transferred by base stations BS interfere each other.

If the signals transferred by base stations BS don't interfere each other, the processor 300 interrupts the present algorithm.

If the signals transferred by base stations BS interfere each other, the processor 300 moves to step S702.

At step S702, the processor 300 commands the transfer of a message through the network interface 306. The message is representative of an establishment of an ICIC procedure.

The message is transferred to the home base station BS2 which generates interference for the base station BS1 or for the mobile terminal MT1. The message may indicate a new power level value of the signals radiated by the base station BS2 or may indicate that the power level of the signals radiated by the base station BS2 has to be reduced.

In a variant, a message is also transferred to the base station BS1 which is interfered by the base station BS2. The message may indicate a new power level value of the signals radiated by the base station BS1 or may indicate that the power level of the signals radiated by the base station BS2 has to be increased.

At next step S703, the processor 300 activates a timer. This timer fixes the maximum time duration of the ICIC process After that, the processor 300 interrupts the present algorithm.

FIG. 7b discloses an example of a second algorithm executed by a core network device according to the present invention.

More precisely, the present algorithm is executed by the processor 300 of the core network device CN.

At step S720, the processor 300 detects the reception, through the network interface 306, of a message comprising an ICIC flag. The message comprises an ICIC flag transferred by the mobile terminal MT2 as disclosed at step S513 of the FIG. 5b and is forwarded by the base station BS1. The ICIC flag informs the core network device CN that the base station BS2 associated to the mobile terminal MT2 which sent the ICIC flag is involved in an ICIC procedure.

The message further comprises information identifying the mobile terminal MT2.

At next step S721, the processor 300 checks if the ICIC flag is acceptable or not.

The ICIC flag is acceptable if the coverage area AR1 of the base station BS1 which forwarded the message received at step S720 is in direct neighbourhood of the coverage area AR2 of the base station BS2 associated to the mobile terminal MT2 which sent the ICIC flag.

The ICIC flag is acceptable if the timer activated at step S703 is not elapsed.

In a variant, the processor 300 further checks if the ICIC flag is acceptable by reading in a data base memorised in the RAM memory 302, if the base station BS2 associated to the mobile terminal MT2 which sent the ICIC flag is involved into an ICIC procedure.

More precisely, the ICIC flag is acceptable if the coverage area AR1 of the base station BS1 comprises at least a part of the coverage area of the base station BS2 when the base station BS2 is not involved in an ICIC procedure.

If the ICIC flag is acceptable, the processor 300 moves to step S722. Otherwise, the processor 300 interrupts the present algorithm. The preferential condition is not set for the mobile terminal MT2.

At step S722, the processor 300 sets the preferential condition for the mobile terminal MT2 has when it receives or establishes a communication with a remote telecommunication device through the base station BS2.

It has to be noted here that, the preferential condition may be set for the mobile terminal MT2 when it receives or establishes a communication with a remote telecommunication device through plural base stations BS the coverage areas of which cover the coverage area AR2 of the associated base station BS2.

The preferential condition is for example, a preferential charging policy for a given service or a group of services. The preferential charging policy for a given service or a group of services provides a charging cost which is lower than the charging cost provided by the charging policy for a given service normally used for charging the mobile terminal MT2 when it accesses the wireless cellular telecommunication network through a macro base station like the base station BS1 the mobile terminal MT is not associated to. The preferential charging policy for a given service or a group of services may be dependent of the duration of the communication and/or of the amount of data transferred and/or received by the mobile terminal MT2 during the communication.

The preferential charging policy for a given service or a group of services may be equal to null value.

The preferential condition may also be for example, preferential service for the mobile terminal MT2 is involved in.

At next step S723, the processor 300 checks if the mobile terminal MT2 moves from the coverage area AR2 of the base station BS2.

For example, the processor 300 checks if the mobile terminal MT2 moves from the coverage area AR2 using information representative of the location of the mobile terminal MT2 provided by the mobile terminal MT2 if it comprises a Global Navigation Satellite System module.

For example, the processor 300 checks if the mobile terminal MT2 moves from the coverage area AR2, using measurement reports on signals provided by the mobile terminal MT2. If a measurement report identifies signals transferred by base stations BS which are not neighbour of the base station BS2 associated to the mobile terminal MT2, it means that the terminal MT2 moves from the coverage area AR2.

If the mobile terminal MT2 moves from the coverage area AR2 of the base station BS2, the processor 300 moves to step S725. Otherwise, the processor 300 moves to step S724.

At step S724, the processor 300 checks if the timer activated at step S703 is not elapsed.

If the timer activated at step S703 is not elapsed, the processor 300 returns to step S723. Otherwise, the processor 300 moves to step S725.

At step S725, the processor 300 removes the preferential condition set at step S722 for the mobile terminal MT2 when it receives or establishes a communication with a remote telecommunication device.

After that, the processor 300 interrupts the present algorithm.

It has to be noted here that, the mobile terminal MT2 may be associated to plural base stations BS.

The present invention has been described when the base stations BS decrease or increase the transmission power of the signals the base stations Bs radiate.

On the same way, the transmission power of the mobile terminals MT may also be decreased or increased.

Naturally, many modifications can be made to the embodiments of the invention described above without departing from the scope of the present invention.

The invention claimed is:

1. Method for setting or maintaining a preferential condition for a mobile terminal, comprising:
   receiving a message transferred by a mobile terminal and forwarded by a first base station, the message comprising information indicating that a second base station which is associated with the mobile terminal is involved in an inter cell interference coordination procedure,
   checking if the information indicating that the second base station which is associated with the mobile terminal is involved in an inter cell interference coordination procedure is acceptable by reading a data base comprising information indicating if the second base station which is associated with the mobile terminal is involved in an inter cell interference coordination procedure and by checking if the coverage area of the first base station comprises at least a part of the coverage area of the second base station,
   determining if the second base station associated with the mobile terminal is involved in an inter cell interference coordination procedure according to a result of the checking,
   setting the preferential condition for the mobile terminal when the mobile terminal is in a communication with a remote telecommunication device through the second base station associated with the mobile terminal, if the second base station associated with the mobile terminal is not involved in an inter cell interference coordination procedure,
   setting the preferential condition for the mobile terminal when the mobile terminal is in a communication with the remote telecommunication device through the first base station not associated with the mobile terminal, if the second base station associated with the mobile terminal is involved in an inter cell interference coordination procedure,
   not setting the preferential condition for the mobile terminal when the mobile terminal is in a communication with the remote telecommunication device through the first base station not associated with the mobile terminal, if the second base station associated with the mobile terminal is not involved in an inter cell interference coordination procedure.

2. Method according to claim 1, wherein the preferential condition is set for the mobile terminal when the mobile terminal is in or close to the coverage area of the base station associated with the mobile terminal when the base station associated with the mobile terminal is involved in the inter cell interference coordination procedure.

3. Method according to claim 1, wherein the preferential condition is not set for the mobile terminal when the mobile terminal is not in or not close to the coverage area of the second base station associated with the mobile terminal when the second base station associated with the mobile terminal is involved in the inter cell interference coordination procedure.

4. Method according to claim 1, wherein the determination if the second base station associated with the mobile terminal is involved in the inter cell interference coordination procedure is made by detecting the reception of a message transferred by the mobile terminal.

5. Method according to claim 1, wherein the method is executed by a core network device of a wireless cellular telecommunication network connected to the base stations.

6. Method according to claim 1, wherein the preferential condition for the mobile terminal when the mobile terminal is in a communication with the remote telecommunication device through the first base station not associated with the mobile terminal is set for a time duration and/or as far as the mobile terminal is located in the coverage area of the second base station associated with the mobile terminal when the second base station associated with the mobile terminal is not involved in the inter cell interference coordination procedure.

7. Method according to claim 1, wherein the preferential condition is a preferential charging policy for a given service or group of services.

8. A non-transitory computer readable medium storing a computer program which can be directly loadable into a programmable device, comprising instructions or portions of code for implementing the steps of the method according to claim 1, when said computer program is executed on a programmable device.

9. Device for setting or maintaining a preferential condition for a mobile terminal, comprising:
  a device configured to receive a message transferred by a mobile terminal and forwarded by a first base station, the message comprising information indicating that a second base station which is associated with the mobile terminal is involved in an inter cell interference coordination procedure,
  a device configured to check if the information indicating that the second base station which is associated with the mobile terminal is involved in an inter cell interference coordination procedure is acceptable by reading a data base comprising information indicating if the second base station which is associated with the mobile terminal is involved in an inter cell interference coordinationrocedure and by checking if the coverage area of the first base station comprises at least a part of the coverage area of the second base station,
  a device configured to determine if the second base station associated with the mobile terminal is involved in an inter cell interference coordination procedure according to a result of the checking,
  a first device configured to set the preferential condition for the mobile terminal when the mobile terminal is in a communication with a remote telecommunication device through the second base station associated with the mobile terminal, if the second base station associated with the mobile terminal is not involved in an inter cell interference coordination procedure,
  a second device configured to set the preferential condition for the mobile terminal when the mobile terminal is in a communication with the remote telecommunication device through the first base station not associated with the mobile terminal if the second base station associated with the mobile terminal is involved in the inter cell interference coordination procedure, the first and second devices for setting the preferential condition not setting the preferential condition for the mobile terminal when the mobile terminal is in a communication with the remote telecommunication device through the first base station not associated to the mobile terminal if the second base station associated with the mobile terminal is not involved in the inter cell interference coordination procedure.

* * * * *